(12) United States Patent
Gandini

(10) Patent No.: US 9,108,692 B2
(45) Date of Patent: Aug. 18, 2015

(54) MANUFACTURING METHOD OF A MOTOR VEHICLE AND MOTOR VEHICLE THEREBY OBTAINED

(76) Inventor: Marcello Gandini, Almese (IT)

( * ) Notice: Subject to any disclaimer, the term of this patent is extended or adjusted under 35 U.S.C. 154(b) by 469 days.

(21) Appl. No.: 12/671,836

(22) PCT Filed: Aug. 7, 2008

(86) PCT No.: PCT/IB2008/053173
§ 371 (c)(1),
(2), (4) Date: Feb. 2, 2010

(87) PCT Pub. No.: WO2009/024883
PCT Pub. Date: Feb. 26, 2009

(65) Prior Publication Data
US 2010/0181801 A1    Jul. 22, 2010

(51) Int. Cl.
*B21D 53/88* (2006.01)
*B62D 65/04* (2006.01)
*B62D 23/00* (2006.01)
*B62D 25/00* (2006.01)
*B62D 31/00* (2006.01)
*B62D 63/02* (2006.01)
*B62D 29/04* (2006.01)
*B62D 29/00* (2006.01)

(52) U.S. Cl.
CPC ............... *B62D 65/04* (2013.01); *B62D 23/00* (2013.01); *B62D 25/00* (2013.01); *B62D 29/04* (2013.01); *B62D 31/003* (2013.01); *B62D 63/025* (2013.01); *B62D 29/00* (2013.01); *B62D 29/002* (2013.01); *B62D 29/041* (2013.01); *Y10T 29/49* (2015.01); *Y10T 29/49616* (2015.01); *Y10T 29/49622* (2015.01); *Y10T 29/49826* (2015.01)

(58) Field of Classification Search
CPC .................. Y10T 29/49826; Y10T 29/49622; Y10T 29/49616; Y10T 29/49; B62D 23/00; B62D 25/00; B62D 29/00; B62D 29/002; B62D 29/04; B62D 29/041; B62D 63/025; B62D 65/04; B62D 31/003
USPC ........... 29/897.2, 897, 592; 296/181.1, 181.2, 296/181.6, 184.1, 190.07, 193.01, 193.04, 296/188, 197
See application file for complete search history.

(56) References Cited

U.S. PATENT DOCUMENTS 2,605,760 A * 8/1952 Cayas .................... 126/343.5 R
3,760,763 A * 9/1973 Brusacoram ............... 440/12.64

(Continued)

FOREIGN PATENT DOCUMENTS

DE    8902503    5/1989
EP    0142581    5/1985

(Continued)

*Primary Examiner* — Peter DungBa Vo
*Assistant Examiner* — Azm Parvez
(74) *Attorney, Agent, or Firm* — Mark J. Nahsen; Barnes & Thornburg LLP

(57) ABSTRACT

There is described a manufacturing method of motor vehicles which achieves the object of reducing the costs deriving from the manufacturing of vehicles belonging to different segments and the costs deriving from the traditional assembly of vehicles which starts from the external shell onto which the elements forming the interiors and the mechanical members are assembled, by suggesting the arrangement of a single self-supporting structural element formed by composite material, already provided with many interior elements, to which a new other interior elements, bodywork elements and mechanical elements can be connected in any assembly order.

16 Claims, 3 Drawing Sheets

(56) References Cited

U.S. PATENT DOCUMENTS

| | | | | |
|---|---|---|---|---|
| 3,968,559 | A | * | 7/1976 | Karlsson ............... 29/430 |
| 4,730,870 | A | * | 3/1988 | DeRees ............ 296/193.04 |
| 5,819,408 | A | * | 10/1998 | Catlin ............... 29/897.2 |
| 7,287,797 | B1 | * | 10/2007 | Belloso ............... 296/35.1 |
| 2002/0099628 | A1 | * | 7/2002 | Takaoka et al. ........... 705/27 |
| 2003/0065584 | A1 | * | 4/2003 | Takaoka ............... 705/26 |
| 2004/0222672 | A1 | * | 11/2004 | Brown ............... 296/214 |

FOREIGN PATENT DOCUMENTS

| | | | |
|---|---|---|---|
| EP | 0297057 | 12/1988 | |
| EP | 1607313 | 12/2005 | |
| GB | 2311966 | 10/1997 | |
| GB | 2311966 A | * 10/1997 | ............ B62D 29/04 |
| WO | WO2006134477 | 12/2006 | |

* cited by examiner

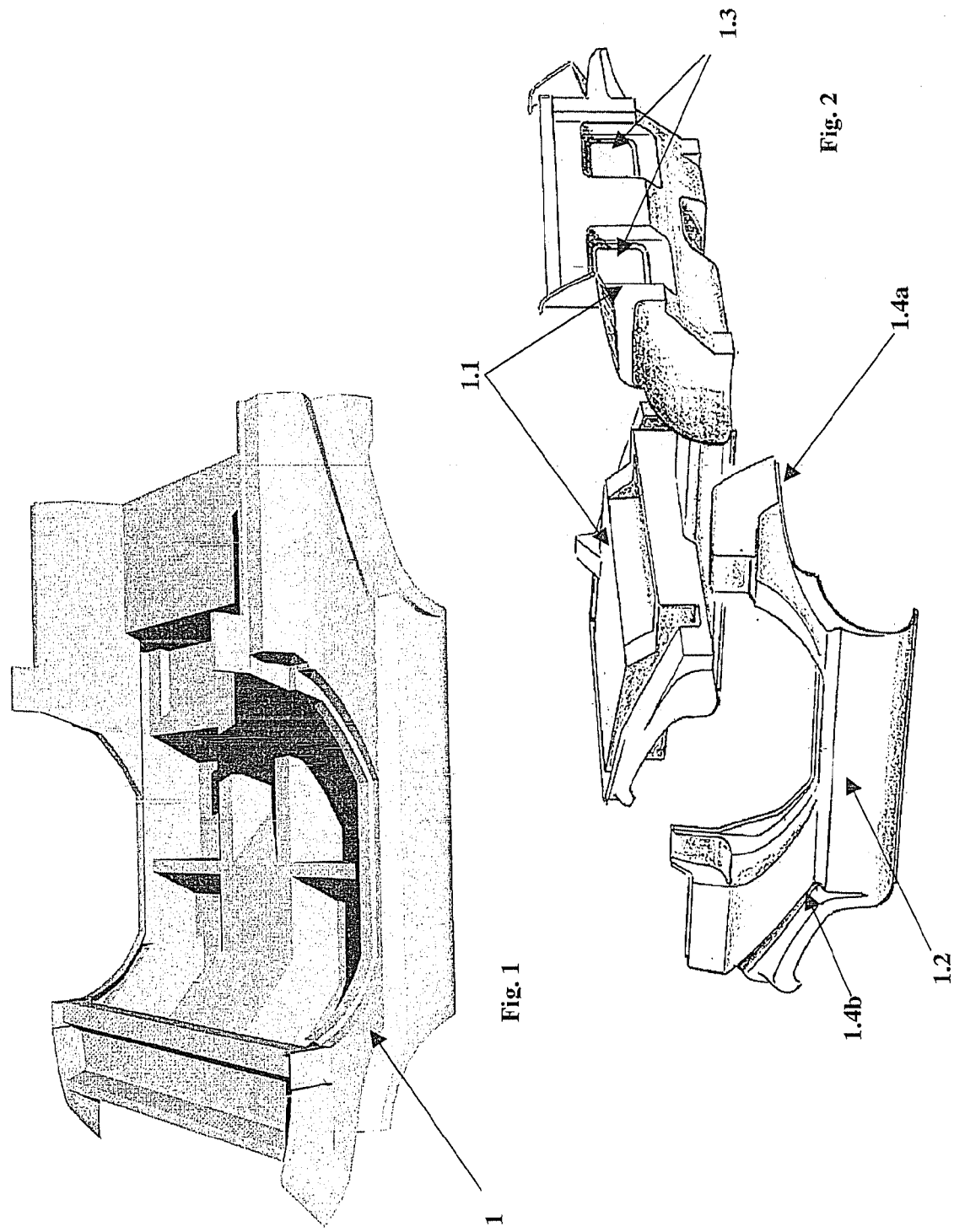

MANUFACTURING METHOD OF A MOTOR VEHICLE AND MOTOR VEHICLE THEREBY OBTAINED

FIELD OF THE INVENTION

The present invention relates to a manufacturing method of a motor vehicle and a motor vehicle thereby obtained, specifically with bodywork formed by composite materials.

STATE OF THE ART

Marketing strategies have forced automotive manufacturers to access the highest possible number of segments. Major manufacturers of large luxury cars have started producing city and medium-sized cars, while attempting to maintain high manufacturing and quality standards.

The different manufacturing sectors require very different technical solutions, e.g. the self-supporting structure of a city car is very different from that of a small off-road vehicle, and is different from that of a flagship vehicle, etc.

Many companies tend to stipulate agreements with competitors for the development of motor vehicles so as to share the engineering and manufacturing costs of common parts of cars in the same segment.

Similarly, some manufacturers develop engines of a certain type which will equip motor vehicles of competitors with which they have established commercial agreements.

It is also known that in the scope of a same group, a same floor bed is shared by cars of the same segment or by cars of slightly different segments, for example a saloon and its estate car version.

In actual fact, the concept is that of recycling a same structural element cooperating with further structural elements, such as the roof, the cowling, etc., so as to form a single, sufficiently rigid body.

Therefore, the characteristic steps of the manufacturing of cars consist in assembling a characteristic load-bearing structure of a vehicle belonging to a given segment starting from a floor bed, by means of weldings and connection elements. Further elements are then added, such as for example the engine and the transmission which are connected together and with said structure. Further elements are later added to the whole.

The interiors are left for last, also to allow the passage of wires from the front to the back.

It is thus apparent that a first drawback of the current way of designing and manufacturing cars derives form the fact of reusing only a small portion of the self-supporting structure of a motor vehicle for manufacturing further vehicles of the same segment. Another drawback depends on the fact that the assembly of the car interiors forces workers and robotized arms to enter inside the structure, e.g. from a side access, to assembly moulding, panelling, upholstery, etc.

SUMMARY OF THE INVENTION

It is the object of the present invention to provide a manufacturing method of motor vehicles which allows to cut both engineering and manufacturing costs of common elements, and the assembly cost of the vehicles.

A further object of the invention is to provide motor vehicles belonging to different segments sharing a structural element which is self-supporting in itself.

The present invention thus aims to reach the above-described objects by making a method for manufacturing motor vehicles mainly formed by bodywork elements, interior elements and mechanical members, which comprises the following steps:

- a lower self-supporting structural element is arranged, defining at least the bottom of the passenger compartment of a vehicle, onto which mechanical members, elements forming the bodywork and elements constituting the interiors are to be connected;
- one or more of said interchangeable bodywork elements defining the segment to which the vehicle belongs are independently arranged;
- one or more of said mechanical elements defining the vehicle performance in relation to the segment to which it belongs are independently arranged;
- one or more of said elements forming the vehicle interiors in relation to the segment and price range to which it belongs are independently arranged;
- one or more bodywork elements, mechanical elements and interior elements are assembled onto said lower self-supporting structural element in any sequence order.

According to an aspect of the invention, the lower self-supporting structural element is originally provided with a set of interior components, said interior components possibly being pre-moulded in a single structural block and being already pigmented in the required colour.

According to a further aspect of the invention, said device is easily applied when one intends to manufacture vehicles belonging to many different commercial segments while limiting investments, because the manufacturing differentiation would be exclusively limited to said bodywork element sets, such as the possible roof, the windscreen, the possible doors, the cowling, etc., and to some mechanical members, such as the suspensions, the transmission, the engine, the driveline and the wheels.

Advantageously, it is possible to make cars belonging to different segments, e.g. off-road cars, sports cars, city cars, vans, etc., starting from a single lower structural element.

Specifically, said element is self-supporting, meaning that the main mechanical members are either directly or indirectly connected to it without involving further structural elements.

Furthermore, it is possible to assemble the elements forming the interiors before having mounted a bodywork element set, e.g. the dashboard can be assembled before mounting the windscreen pillars and the roof so as to prevent workers or mechanical arms from having limited, inconvenient access to the vehicle.

Said elements forming the interiors can be integrated from the beginning in said lower self-supporting structural element, thus drastically reducing the number of manufacturing steps.

The dependent claims describe preferred embodiments of the invention.

BRIEF DESCRIPTION OF THE DRAWINGS

Further features and advantages of the invention will be more apparent in the light of the detailed description of a preferred, but not exclusive embodiment of a vehicle resulting from the application of the manufacturing method object of the present invention, illustrated by way of non-limitative example, with the aid of the accompanying drawings, in which:

FIG. 1 shows a lower element 1, which is characterized in that it is self-supporting and adapted to be assembled with different sets of elements defining the bodywork of the vehicle and consequently the segment to which it belongs;

FIG. 2 shows a preferred embodiment of said element which is obtained by the assembly of portions in itself;

DETAILED DESCRIPTION OF A PREFERRED EMBODIMENT OF THE INVENTION

Figure 3:
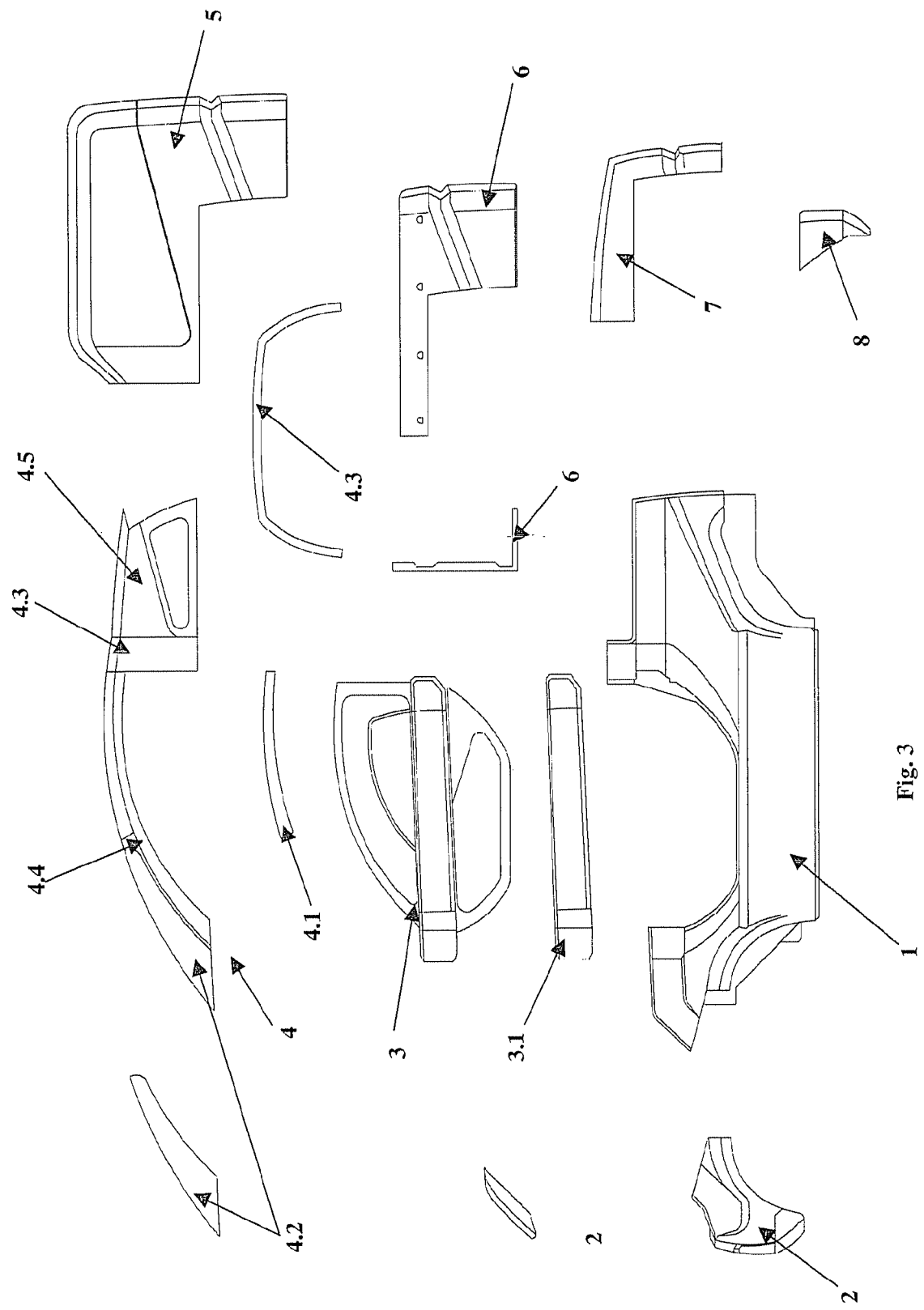
FIG. 3 shows examples of bodywork elements belonging to different element sets.

The method according to the present invention comprises a step of engineering of a lower self-supporting structural element, already provided with many internal components, onto which the mechanical elements, such as the transmission, the driveline and the engine, other interior elements and bodywork elements are subsequently assembled in any order.

Specifically, the lower self-supporting structural element may be already provided in origin with a set of interior components, such as for example dashboard, object holder panels, soundproofing panels, etc., which may even be pre-moulded in a single structural block, and which are already pigmented in the required colour, thus avoiding subsequent manufacturing steps, such as those of assembly, painting or rust treatment, etc., features of the traditional procedures based on structural metal.

Other elements, such as for example the seats, the upholstery, can be inserted later.

Said bodywork elements can even considerably vary the shapes, size and functions of the vehicle that they form.

By implementing said method, there may be obtained, for example, a lower element like that shown in FIG. 1.

This may be in turn formed by portions made separately and then assembled for manufacturing needs, as shown in FIG. 2, wherein a central element 1.1 is completed on each side by a side guard of which only the right-hand one 1.2 is shown. The various parts may also be joined together with techniques known in themselves, e.g. by gluing, screwing or ultrasound welding.

The material used for said preferred embodiment, specifically for the lower self-supporting structural element, and for the interior components of which it is already provided, is a hollow composite plastic material in which a foam may be injected.

The composite plastic material may be a compound formed by ABS and polycarbonate, possibly filled with fibreglass, injected into the compound for reinforcing some parts most subject to stress.

The foam may be polyurethane and may assume a double function: to soundproof the vehicle and confer further rigidity thereto.

Advantageously, in relation to the vehicle type, to the total weight, according of the set of mechanical members used, and for the destination of use of the vehicle, the density of said foam can be varied thus obtaining more or less rigidity and/or soundproofing of the single supporting element i.e. of said lower element 1.

Furthermore, electric wires and/or other components, such as for example cable-holder sheathing, the terminals of which protrude to be then connected to other parts of the vehicle, may be further inserted in said foam.

FIGS. 1 and 2 highlight the shape of said basin-shaped lower element, in which in addition to the various pillars and reinforcement side-members there are visible two openings 1.3, symmetric with respect to the middle line of the element, adapted to accommodate the control pedal board of the vehicle, which is inserted from the outside through said openings, so as to be able to indifferently contemplate either right-hand drive or left-hand drive.

FIG. 3 shows some elements forming the bodywork which can be mounted on said lower element 1 in relation to the reference segment of the vehicle to be made.

Specifically, the element 4 shows an upper covering comprising roof 4.1, pillars 4.4, windscreen 4.2, roll bar 4.3 and tail end 4.5.

Said covering may be assembled separately from the rest of the vehicle and may superimposed onto it after having connected the elements forming the interiors to the vehicle.

When a vehicle, e.g. a van, is intended to be constructed, a body 5, either glazed or not, is preferred to said tail end 4.5, e.g. like that shown in the figure, which perfectly joins with said upper covering 4.

When instead a so-called pick-up vehicle is required, an element 6 is mounted instead of said element 5 which, along with said lower element 1 forms an open bodywork for loading cargo, etc.

In such a case, a further alternative is that of completing the rear part of the vehicle with a boot 7, like the one shown in the figure.

If the vehicle is not further lengthened for the use of elements such as 5 and 6, the vehicle is completed with a bumper 8 of short type, otherwise a bumper which, despite being interchangeable with respect to the shorter type, is longitudinally longer to better couple with said elements 5 or 6.

Figure 4:
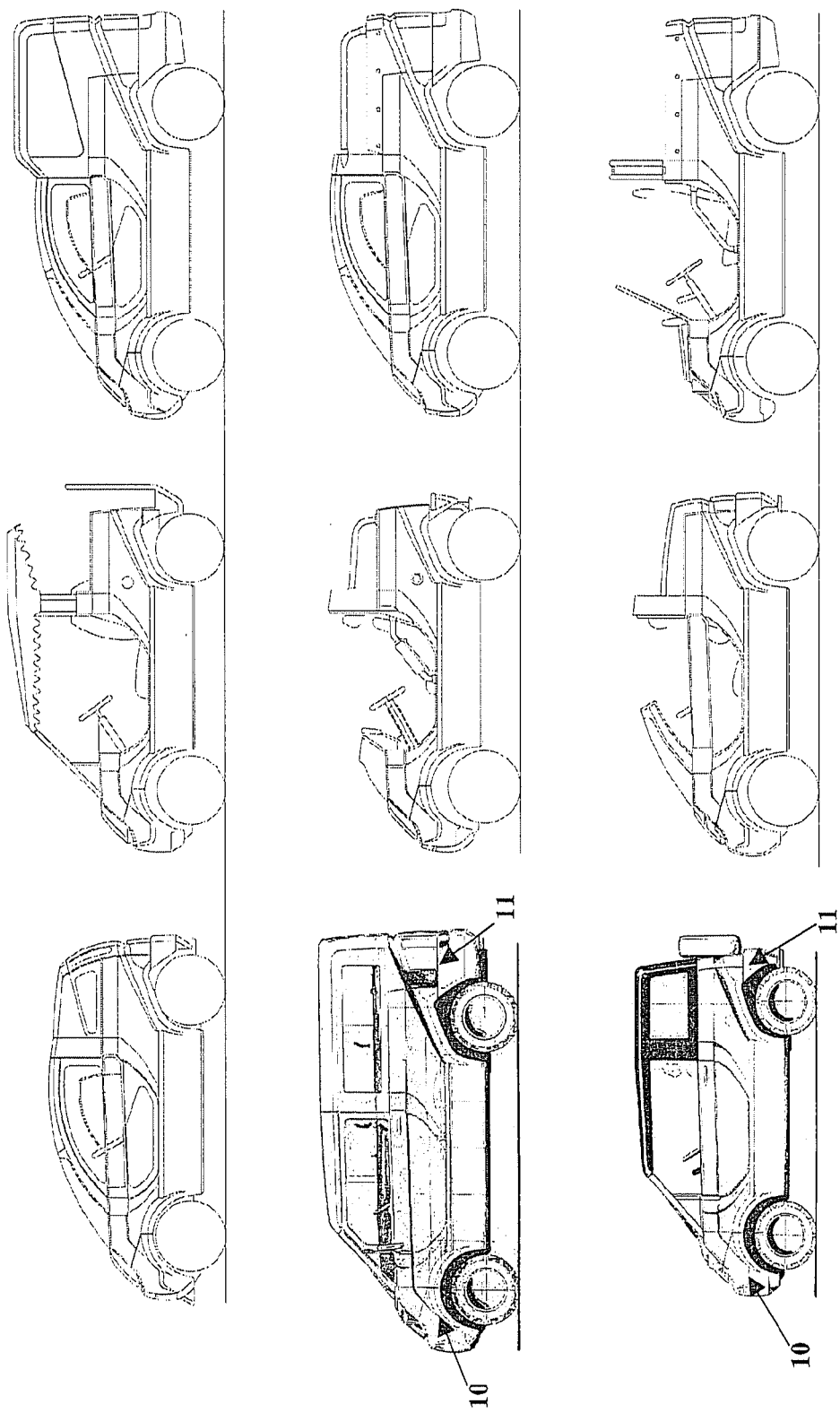
FIG. 4 shows some preferred embodiments of vehicles obtained from said same lower element 1 onto which different sets of mechanical, bodywork and interior elements are applied.

FIG. 4 shows, by way of example, some vehicle versions belonging to different segments, in which the lower element 1 is always recognizable.

The possible need to vary the wheelbase of the vehicle may be solved by using wheels of different diameter.

With regards to mechanics, in order to make the combination of various different technological solutions possible, the mechanical parts are connected to said lower element 1 by means of false frames independently preassembied and subsequently connected to the lower element 1 during the final assembly step. For example, FIG. 4 shows a front false frame 10, and a rear false frame 11. For example, a wheel axle, with corresponding suspensions, an engine-transmission assembly or other may be preassembled into the false frame.

These thus act as interface with said lower element 1, meaning, that the connection means, e.g. joints and holes between said false frames and the lower element 1 remain constant regardless of the shape, number and arrangement of the connection means between said false frames and the corresponding mechanical members.

Specifically, it is particularly advantageous to prepare appropriately templates for allowing the asynchronous assembly of the mechanical parts, the pre-assembled whole of which is connected to said lower element 1 by means of said false frames.

Finally, it is possible by means of the method described above to very rapidly produce a vehicle with features and appearance adapted to the various markets, also because it may not be necessary to paint the bodywork, if it is already formed by pigmented composite material, thus minimising the investments that manufactures are forced to make to rapidly satisfy customer requests.

According to another aspect of the invention, said elements forming the bodywork may also be made of composite material, e.g. already pigmented, and connected to said lower element 1 by means of glues or by means of joints and/or connection members, such as screws, bolts, etc.

In such a manner, there is obtained a vehicle in which the shell and the supporting structure are entirely made of composite material, with a further cutting of costs related to the easy implementation of the various steps of the manufacturing process, grouped together in a single step.

The plastic material of which the various parts described above are made, allows to obtain a particularly light vehicle. For example, a vehicle with a total weight of approximately 600 kg may be obtained.

Furthermore, the basin shape of the self-supporting structural element, combined with the light-weight of the material, contributes to obtain another important feature: the floating of the vehicle in case of immersion in water, even accidental. This is due to the fact that the floating level in water of the vehicle may be kept high, e.g. approximately 20 cm over the lowest point of the self-supporting structural element. In this manner, any possible opening of the vehicle, such as for example the openings 1,3 for inserting the pedal board, may remain over the floating level. Similarly, the lower edge of the doors will be at a higher level than the floating level.

Preferably, at the bottom of the basin of the self-supporting structural element, appropriate check valves are made which open outwards allowing water to exit from the vehicle, e.g. after an inside washing, and close in case of attempt of water seeping from the outside. Said valves may be made of known type plastic. It is not necessary to provide further details of the manufacturing method because a person skilled in the art may apply known procedures and machinery for implementing the various steps of the method once it is known on the basis of that disclosed herein.

The particular embodiments here described do not limit the content of this application which covers all the variants of the invention as defined in the claims.

The invention claimed is:

1. A manufacturing method of motor vehicles mainly formed by bodywork elements, interior elements and mechanical members, which comprises the following steps:
   a lower self-supporting structural element formed from a hollow composite plastic material is arranged, defining at least the lower portion of the passenger compartment of a vehicle, onto which mechanical elements, elements forming the bodywork and elements constituting the interiors are to the connected;
   one or more interchangeable bodywork elements for a particular vehicle design segment are independently arranged;
   one or more mechanical elements defining the vehicle performance in relation to the vehicle design segment to which belongs are independently arranged;
   one or more elements forming the vehicle interiors in relation to the vehicle design segment and a price range to which it belongs are independently arranged;
   one or more bodywork elements, mechanical elements and interior elements are assembled onto the lower self-supporting structural element in any sequence order; and
   stiffening the lower self-supporting element in relation to mechanical features which are obtained by the elements and in relation to mechanical vibrational features of the mechanical elements coupled either directly thereto; wherein the step of stiffening the lower self-supporting structural element comprises a step of injecting, into one or more internal cavities of the lower self-supporting structural element, a foam of variable density in relation to the mechanical features and the mechanical-vibrational features of the mechanical members coupled directly to the lower self-supporting element.

2. A method according to claim 1, wherein the lower self-supporting structural element is originally provided with a set of interior components, said interior components possibly being pre-molded in a single structural block and being already pigmented in color.

3. A method according to claim 1, further comprising a step of arranging false frames adapted to allow assembly of various types of preassembled mechanical means for one step of assembling the vehicle.

4. A method according to claim 3, wherein mutual pre-assembly of some mechanical members is concurrently arranged during assembly.

5. A method according to claim 3, wherein mutual pre-assembly of some bodywork members is concurrently arranged during assembly.

6. A method according to claim 3, wherein the assembly is performed after a further step of arranging assembly members, including holes, screws and/or joints.

7. A method according to claim 3, wherein the assembly is performed following a further step of arranging joints and/or glues.

8. A method according to claim 1, further comprising a step in which there are arranged templates adapted to facilitate pre-assembly of mechanical elements and/or bodywork elements and/or interior elements.

9. A method according to claim 1, wherein tires of different diameter are arranged in order to vary a wheelbase of the assembled vehicle.

10. A method according to claim 9, wherein the lower self-supporting structural element and/or the one or more interchangeable bodywork elements is/are made of composite plastic material, preferably an ABS and polycarbonate compound, possibly filled with fiberglass.

11. A method according to claim 1, wherein the lower self-supporting structural element and/or the one or more interchangeable bodywork elements are cables.

12. A method according to claim 11, wherein the foam is polyurethane.

13. A method according to claim 12, wherein the lower self-supporting structural element is basin-shaped.

14. A method according to claim 1, wherein openings are made in the lower self-supporting structural element at a given height with respect to a lowest level, for the insertion from an outside of parts belonging to other assembly elements.

15. A method as in claim 1, comprising a further step of making one or more check valves at a bottom of the lower self-supporting structural element, which valves open outwards allowing water to exit from the vehicle, and which valves close in the case of water entering from an outside.

16. A manufacturing method of motor vehicles mainly formed by bodywork elements, interior elements and mechanical members, comprising the following steps:
   providing a lower self-supporting structural element formed from a hollow composite plastic material, which forms at least the lower portion of the passenger compartment of a vehicle, onto which mechanical elements, bodywork elements and interior elements are connected;
   providing interchangeable bodywork elements for a particular vehicle design segment;
   providing mechanical elements defining the vehicle performance in relation to the vehicle design segment to which it belongs;
   providing interior elements for the vehicle design segment to which it belongs;
   assembling the bodywork elements, the mechanical elements and the interior elements onto the lower self-supporting structural element in any sequence order;

providing a headliner assembly and assembling the headliner assembly onto the lower self-supporting structural element; and stiffening the lower self-supporting element in relation to the specific mechanical elements assembled to the lower self-supporting element to dampen mechanical vibrations specific to the mechanical elements coupled to the lower self-supporting element;

wherein the step of stiffening the lower self-supporting structural element comprises a step of selectively injecting, into one or more internal cavities of the lower self-supporting structural element, a foam of variable density to dampen the mechanical vibrations specific to the mechanical elements coupled to the lower self-supporting element and selectively injecting foam into the headliner assembly that differs in density to the foam injected into the lower self-supporting structural element.

* * * * *